US005754819A

United States Patent [19]

Lynch et al.

[11] Patent Number: 5,754,819

[45] Date of Patent: May 19, 1998

[54] LOW-LATENCY MEMORY INDEXING METHOD AND STRUCTURE

[75] Inventors: William L. Lynch, Palo Alto; Gary R. Lauterbach, Los Altos, both of Calif.

[73] Assignee: Sun Microsystems, Inc., Mountain View, Calif.

[21] Appl. No.: 282,525

[22] Filed: Jul. 28, 1994

[51] Int. Cl.$^6$ .................................................. G06F 12/00
[52] U.S. Cl. ........................... 395/421.08; 395/412
[58] Field of Search ..................... 395/421.08, 412, 395/421.1, 468

[56] References Cited

U.S. PATENT DOCUMENTS

| | | | |
|---|---|---|---|
| 4,215,402 | 7/1980 | Mitchell et al. | 364/200 |
| 5,515,522 | 5/1996 | Bridges et al. | 395/468 |
| 5,530,834 | 6/1996 | Colloff et al. | 395/463 |

FOREIGN PATENT DOCUMENTS

| | | | |
|---|---|---|---|
| 0440908A2 | 8/1991 | European Pat. Off. | G06F 9/38 |
| 0694845A1 | 1/1996 | European Pat. Off. | G06F 12/08 |

OTHER PUBLICATIONS

Semiconductor Memories, A Handbook of Design, Manufacture and Application, Betty Prince, Second Ed., John Wiley & Sons.

Evaluation of A+B=K Conditions Without Carry Propagation, Cortadella et al., IEEE Transactions on Computers, vol. 41, No. 11, Nov. 1992.

Evaluating A+B=K Conditions in Constant Time, Cortadella et al., IEEE, pp. 243–245.

"Wired-in Hash Function for Data Cache Address Calculation", IBM TDB, vol. 34, No. 12, May 1992.

*Primary Examiner*—David K. Moore
*Assistant Examiner*—Than Nguyen
*Attorney, Agent, or Firm*—Steven F. Caserza; Flehr, Hohbach, Test, Albritton and Herbert

[57] ABSTRACT

A significant reduction in the latency between the time the addressed components of memory are ready and the time addressed data is available to the address components of memory is achieved by processing the raw address information faster than the addition used in the prior art. XOR memory addressing replaces the addition of the base and offset address components with an XOR operation, eliminating carry propagation and reducing overall latency. In another embodiment, a sum-addressed memory (SAM) also eliminates the carry propagation and thus reduce the latency while providing the correct base+offset index to access the memory word line corresponding to the correct addition; thus a SAM causes no XOR duplicate problems.

18 Claims, 7 Drawing Sheets

LOW-LATENCY MEMORY INDEXING METHOD AND STRUCTURE

INTRODUCTION

This invention pertains to memory systems, and more specifically to a method and structure for addressing memories with low latency.

Modern processors address memory, including cache memories, with base+offset addressing. FIG. 1 is a diagram depicting one embodiment of a typical prior art addition-indexed memory 10, which can if desired serve as a cache memory. Addition-indexed memory 10 includes data array 11 having a plurality of word lines, such as word lines 11-0 through 11-7, which are capable of being accessed by access signals provided by AND gates 12-0 through 12-7, respectively, in order to provide a selected one of the data words stored in data array 11 on output bus 13. The addresses applied to AND gates 12-0 through 12-7 are derived by address addition circuit 15, which receives a base address a2, a1, a0, and an offset address b2, b1, b0, which are added in order to provide select signals s0, $\overline{s0}$, s1, $\overline{s1}$, s2, $\overline{s2}$ for application to the array decoder formed by AND gates 12-0 through 12-7.

The latency from the time when the address components 12-0 through 12-7 are ready until the time the addressed data is available includes the time required for addition circuit 15 to add base and offset address data. This excess latency typically manifests itself in a pipelined processor as a load-use penalty; the load results are unavailable until two cycles after the machine scalarity exacerbates the problem twofold: load-delay slots must become load-delay groups, requiring many more instructions to be issued to hide the latency, and the effect of the latency becomes relatively more significant as the baseline performance of the machine improves. Thus, while uniscalar machines may show only 0.05 CPI/1.8 CPI=3% performance loss due to one load delay slot, as described in Olukotun, Kunle, Trevor Mudje, and Richard Brown, "Performance Optimization of Pipelined Primary Caches", 19th Annual International Symposium on Computer Architecture, 1992, pages 181–90, simulations of a three-scalar machine show 10% performance loss due to a single load delay slot.

As well as data caches, other CPU memory units are also addressed after an addition of base and offset address information. Instruction caches frequently require additions before indexing; both sequential code (incrementing) and pc-relative branches require some form of addition before cache indexing. Table Lookaside Buffers (TLBs) also usually require a base+offset addition before translation begins. Register windows may also be implemented with a base pointer plus offset address.

SUMMARY

In accordance with the teachings of this invention, a significant reduction in the latency between the time the addressed components of memory are ready and the time addressed data is available to the address components of memory is achieved by processing the raw address information faster than the addition used in the prior art.

In one embodiment of this invention, XOR memory addressing replaces the addition of the base and offset address components with an XOR operation. XORing the raw base and offset address information eliminates carry propagation and thereby reduces the overall latency, while the resulting duplicated entries only somewhat increase complexity. The XOR speed improvement arises primarily from the lack of any information transfer among the bits (i.e., a carry chain).

In another embodiment, a sum-address-memory (SAM) also eliminates the carry propagation and thus reduces the latency while providing the correct base+offset index. Like XOR memories of this invention, sum-addressed-memories reduce the address-component-ready to data-available latency. SAMs reduce latency less than XOR memories, but access the memory word line corresponding to the correct addition; thus a SAM causes no XOR duplicate problems and when used as a cache memory has a miss rate equal to a conventional cache memory.

Neither the XOR or SAM method and structures of this invention have carry propagation: XOR and SAM logic require constant latency regardless of the number of bits while addition latency increases with the number of bits. Thus, the advantage of XOR and SAM over prior art addition-before-indexing increases with memory size.

DETAILED DESCRIPTION

XOR Memories

In accordance with one embodiment of this invention, base and offset address components are combined by exclusive OR operations, rather than additions. The use of an exclusive OR operation increases speed in that, unlike an addition operation, no carry operations are required.

XORing the base and offset address components eliminates carry propagation and reduces the overall latency but the resulting duplicated entries somewhat increase complexity. The XOR speed improvement arises primarily from the lack of any information transfer among the bits (i.e., a carry chain). The addition of the address components must still occur for the tag check, but this addition may now proceed concurrently with cache access, for example utilizing the circuitry shown in the exemplary block diagram of FIG. 2.

Figure 2:
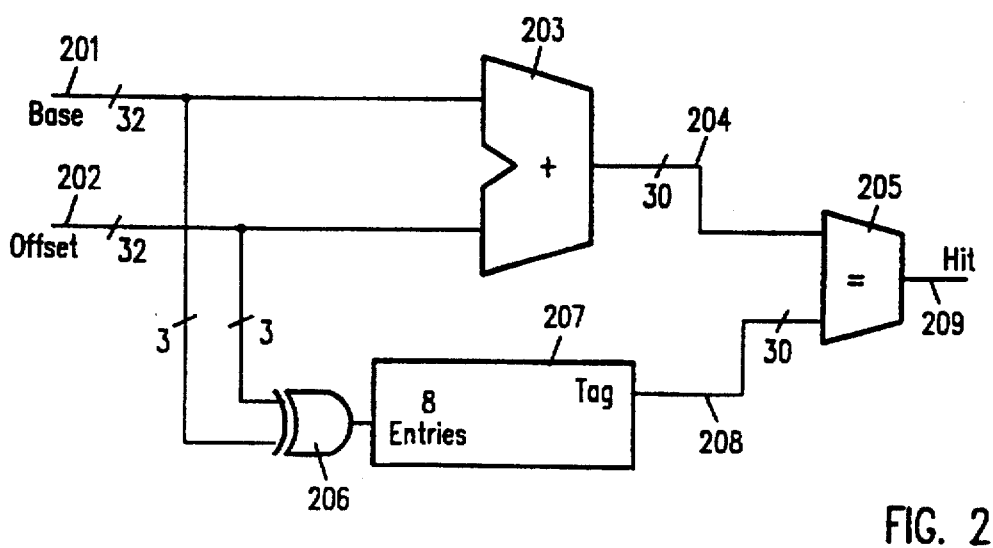
FIG. 2 is a diagram depicting one embodiment of a circuit suitable for use in accordance with the teachings of this invention in which base and offset address bits are added for the sole purpose of performing the tag checks.
Figure 5A:
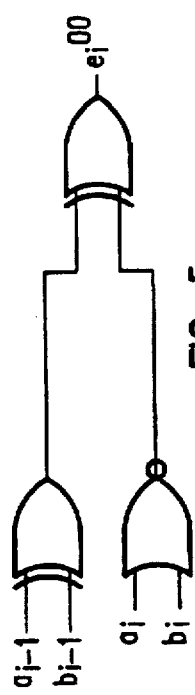
FIGS. 5a through 5d are a schematic diagram depicting embodiments of the $e_i$ functions of equation (7)
Figure 5B:
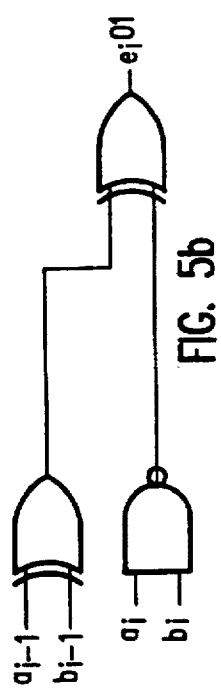
Figure 5C:
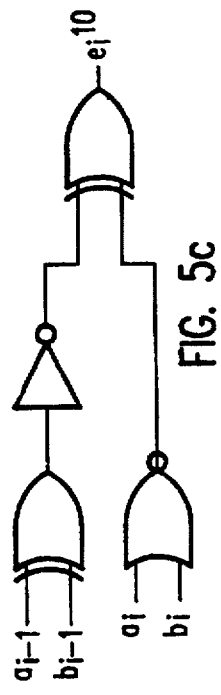
Figure 5D:
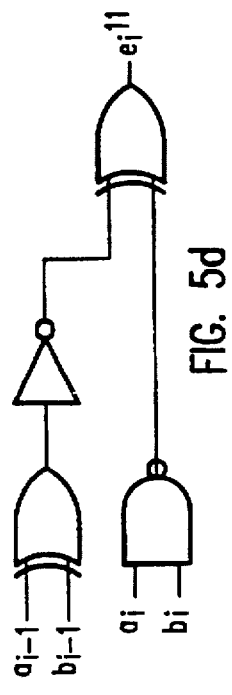
Figure 3:
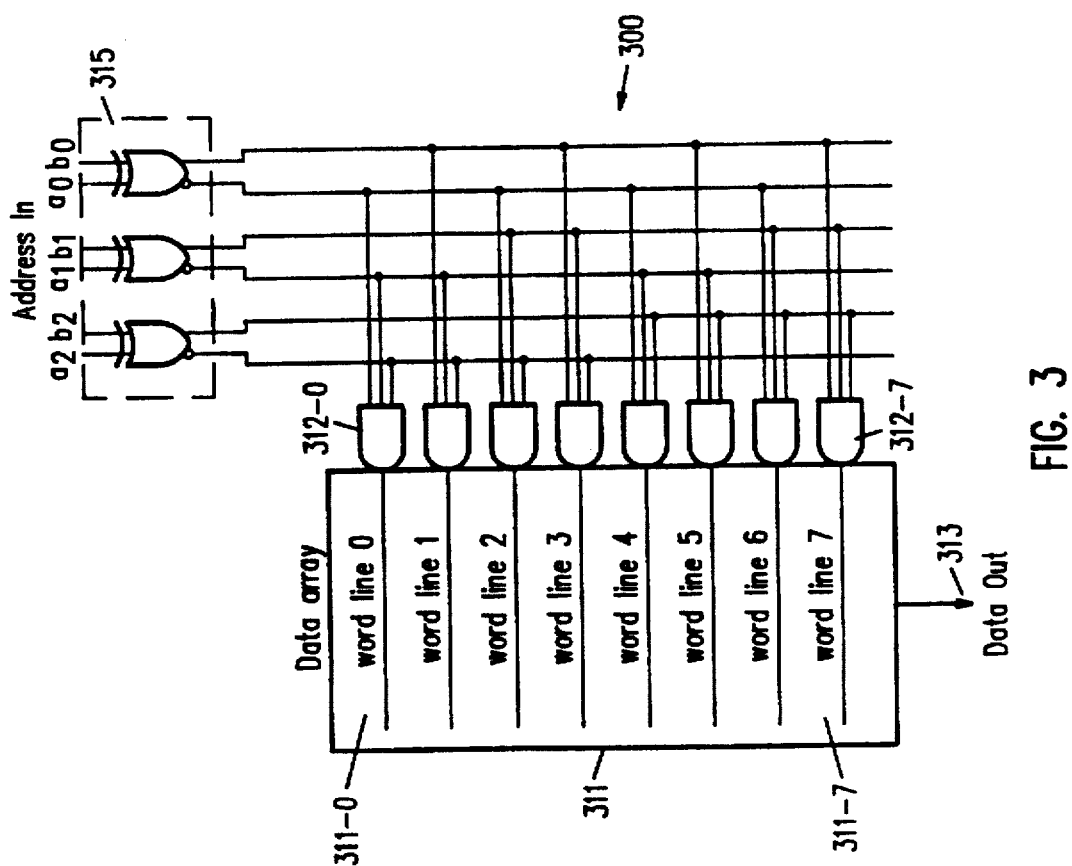
FIG. 3 is a diagram depicting one embodiment of a memory structure of this invention, utilizing exclusive ORing of the base and offset components of the address.

Referring to FIG. 2, in this example, a 32 bit base address and a 32 bit offset address are received on busses 201 and 202, respectively, and are applied to addition circuitry 203, which provides a 30 bit result on output bus 204 to comparator circuitry 205. Simultaneously the base and offset address information is provided via busses 201 and 202 to exclusive OR circuitry 206 which provides index output data to memory array circuit 207, which provides a 30 bit tag word via bus 208 to comparator circuit 205, enabling comparator circuit 205 to provide a one bit hit signal on output lead 209 indicating whether the addressed data is in the cache memory. Note that in this example the cache line size is four bytes so that the lower two bits of the 32 bit address is not needed to index cache or check the tag. Simultaneously, the memory array circuit (such as shown in FIG. 3) provides 32 bits of output data on data bus 313. Thus, although the addition of the address base and address offset components still take place in order to accomplish the tag check, this addition operation takes place concurrently with cache access, and thus no latency is incurred.

Both direct-mapped and set-associative caches map a large address range into the smaller index range of the cache with a hash function. Typically a modulus function of the cache index range is used as the hash function because it is very simple to implement as described, for example, in Smith, Alan Jay, "Cache Memories", Computing Surveys, 14(3):473-530, September, 1982, (i.e., after the base+offset addition the low order N address bits index the cache). A tag on each cache entry disambiguates the many addresses that can map into a single cache index.

Like conventional caches, XOR caches of this invention also use a hash function to map a large address range into a smaller cache index range, but that hash function combines the base and offset components of a memory reference with an exclusive-OR rather than an addition. The result of the exclusive-or of the low order bits of the address components is used to index the cache.

FIG. 3 shows the arrangement of one embodiment of cache index generation in an cache memory of this invention, with the low latency hash function provided by exclusive OR operation performed by address manipulation circuitry 315. Functions other than exclusive OR functions can also be used in accordance with the teachings of this invention. As shown in FIG. 3, one embodiment of an exclusive or memory circuit 300 constructed in accordance with the teachings of this invention includes memory array 311 (corresponding generally to memory array circuit 207 of the embodiment of FIG. 2) including a plurality of word lines 311-0 through 311-7, each storing a data word. A selected one of the data words is read out via output bus 313 in response to memory access signals provided by AND gates 312-0 through 312-7, each correspond to an associate one of the word lines in memory array 311. AND gates 312-0 through 312-3 are driven by signals generated from the base address component a2, a1, a0 and the offset address component, b2, b1, b0, as combined by exclusive OR gate circuitry 315 (corresponding generally to exclusive OR circuitry 206 of the embodiment of FIG. 2).

The XOR memory of this invention uses a subset of the address bits to index the cache and thus shares with memories of the prior art the unavoidable characteristic of mapping many addresses to the same index. The XOR cache has the additional characteristic, not shared with conventional cache indexing, of mapping one address to several indices. This mapping of one to many arises when two sets of address components sum to identical indexes but XOR to different indexes. For example, a base of five and an offset of one have a traditional index of six, but an XOR index of four. The same address results from a base of six and an offset of zero, but the XOR index is six rather than the four of the other base-index pair. In this embodiment, the XOR cache tag includes the "index" bits from the actual address because the location no longer specifies those bits, as shown in Table 1.

TABLE 1

| Base | Offset | Index | Tag |
|------|--------|-------|-----|
| 5 | 1 | 4 | 6 |
| 6 | 0 | 6 | 6 |

Apart from the necessary extra tag bits, the one-to-many mapping of the XOR memory of this invention results in two problems: an increased miss rate relative to the same size traditional cache, and greater difficulty in handling writes to the cache. One address can occupy many indices in an XOR cache memory of this invention; this duplicating reduces the effective size of the cache thereby increasing its miss rate. At the same time any writes to the XOR cache memory of this invention requires an update of all of the indices which contain the write address, in order to maintain consistency. We call data from a single address residing in multiple cache locations a "duplicate".

There are several ways of handling the duplicates in an XOR cache memory of this invention. If we allow duplicates to be entered into the cache then we must be able to update all of the duplicate entries for a particular address on a write to that address. In one embodiment of this invention, this is accomplished with a content addressable memory with one entry per cache index that matches on the address resident in the corresponding cache index. In this embodiment, a write is performed by presenting the write address to the CAM cells which drive the word lines of all of the duplicate cache indexes that contain the address.

In an alternative embodiment of this invention, the solution to the problem of duplicates is to prevent their creation while filling the XOR cache. In this embodiment, the XOR cache is included in a second-level cache so that a record is maintained in each second level cache line of the XOR cache index that was filled from that line. On a subsequent miss of the XOR cache the previous XOR index that was filled from the second level cache line is invalidated and updated with the new XOR index. This method ensures that at any given time data from one address can be resident at only one index in the XOR cache. By disallowing duplicates the problem of writing to the cache is solved; however there is a possible miss rate penalty to be paid. If one address is alternately referred to by base+offset components that map to two different XOR cache indices, the resultant activity will be to constantly fill one index and invalidate the other. Fortunately this seems to be a rare occurrence; Table 2 compares the miss rates of an XOR cache memory system of this invention with duplicates disallowed to a prior art cache memory of the same size on the SPEC92int programs. SPEC92int and the programs specified in Table 2 are benchmark programs available from the Standard Performance Evaluation Corporation of Fairfax, Va. The XOR cache memory system of this invention miss rate is 10% higher than the prior art cache. The percent of misses that invalidate a duplicate was measured to be quite infrequent and is also shown in Table 2.

TABLE 2

XOR 1KB cache miss rate comparison miss rate (% instructions)

| SPEC92int Program | conventional | XOR | % misses invalidate duplicates |
|---|---|---|---|
| 008.espresso | 4.86 | 5.32 | 2.58 |
| 022.li | 4.37 | 5.56 | 1.18 |
| 023.eqntott | 2.69 | 2.85 | 0.009 |
| 026.compress | 4.59 | 5.13 | 0.02 |
| 00.72.sc | 3.29 | 3.69 | 1.03 |
| 085.gcc | 3.74 | 4.34 | 0.39 |

SAM Memories

In an alternative embodiment of this invention, a sum-addressed memory (SAM) is provided.

A sum-addressed memory (SAM) also eliminates the carry propagation and thus reduces the latency while providing the correct base+offset index. SAM memories incur only slightly more latency than XOR memory indexing and significantly less latency than performing addition before cache indexing. Like the XOR memories of this invention, sum-addressed-memories of this invention reduce the address-component-ready to data-available latency. SAM memory reduce latency less than XOR memory, but access the memory location corresponding to the correct addition; thus a SAM memory causes no XOR duplicate problems and thus when used as a cache memory has a miss rate equal to a conventional cache.

Memories of this invention perform functions of multiple input variables in the decoder of RAM arrays beyond the normal decoding function. The normal decoding function takes one length-n input vector and decodes it into 1 of $2^n$ outputs, which then drives a word line. SAM decoders take a number of length-n input vectors and decodes into 1 of $2^n$ outputs equal to the evaluation of the function for those vectors. SAM can evaluate functions which "ripple", i.e. where an output bit depends on the evaluation of the function for other input bits.

Figure 4:
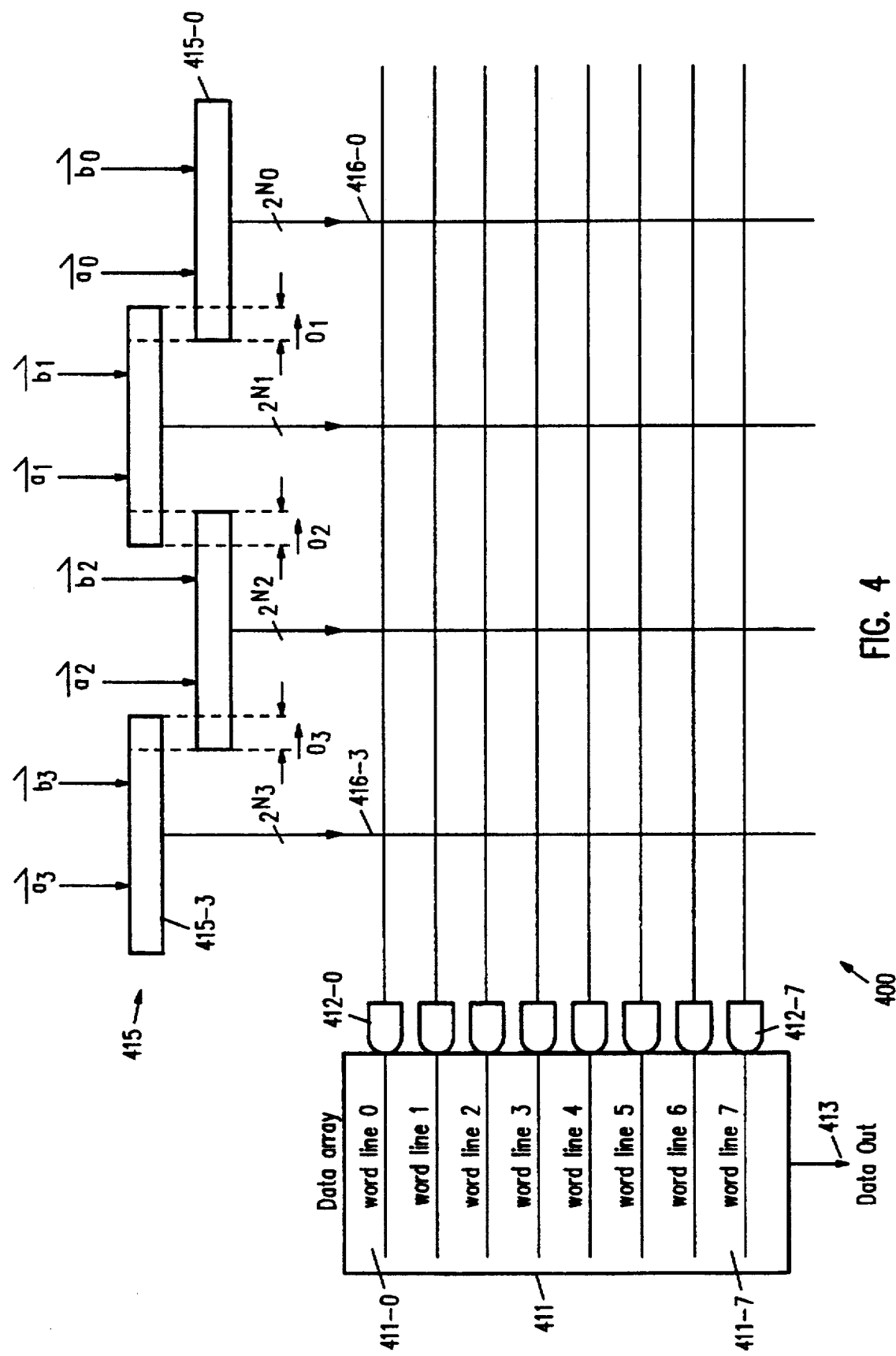
FIG. 4 is a diagram depicting on embodiment of a SAM of this invention.

SAM operates on overlapping segments of the input vectors, as depicted in FIG. 4. Base address bits form vector a, having a plurality of segments $a_0$ through $a_3$ and offset address bits form vector b, having a plurality of segments $b_0$ through $b_3$ in the exemplary FIG. 4. These segments need not be identically sized for correct operation. Thus, if desired, each segment can be of any size, and the amount of overlap can be different from segment to segment, so long as the segments overlap by the number of bits necessary to communicate the necessary ripple information from one segment to the next, based on the maximum influence on more significant bit positions as a result of a computation at a given bit position. For the addition embodiment of this invention, the necessary overlap is only one bit. Thus as shown in FIG. 4, overlap is provided by overlap vectors $O_1$ through $O_3$. For a 53×53 bit multiply (as a standard double precision multiply) embodiment of this invention, the necessary overlap is 6 bits to accommodate the maximum influence of six bits.

The output of each of the segment SAM circuits as shown in FIG. 4, is a $2^j$ of $2^n$ fully decoded output, where j is the amount of necessary overlap for the implemented function, and n is the number of bits of that SAM circuit. Of interest, this is distinct from the prior art of predecoding addresses, in that predecoding decodes n address bits to a single one of $2^n$ output lines and does not evaluate a function of multiple address input vectors. In the embodiment of FIG. 4, input segments of address bits are operated on by functions 415-0 through 415-3 to provide a set of decoded output signals on decoded busses 416-0 through 416-3, having bit lengths of $2^{n_0}$ through $2^{n_3}$, respectively, where $n_0$ is the number of bits associated with function 415-0, and the like. A SAM circuit with equal segments of size n and equal overlap of size j is termed an "n-j" bit SAM circuit. The ANDing of the decoded lines into the word line will select the final $2^j$ of all the possible word lines. Either 1) one of the segments must use the overlap to fully decode into 1 of $2^n$, or 2) a plurality of word lines holding $2^j$ elements is read from the RAM and a desired element is later selected by a 1 of $2^j$ multiplex selection. If there is no carry in bit, the low-order segment may not be overlapped by any "lower-order" information (i.e., lower order bits of the function not used to index the RAM), and thus will naturally come down to 1 of $2^n$. Any lower-order information such as the carry in bit(s) will provide the information necessary to either fully decode the low-order segment to 1 of $2^n$ or to select the 1 of $2^j$ outputs, as with all other segments.

The embodiment of FIG. 4 evaluates a 2-input function with inter-segment communication of overlapping bits. As an example, one overlapping bit is an appropriate implementation of the addition function. In this embodiment, carry in bit Cin provides the lower-order information which fully decodes the low-order segment to 1 of $2^{n_0}$ In alternative embodiments, the function calculated to provide a memory address decode need not be a addition of A and B. In these alternative embodiments, any desired function which ripples is used, that is any function which has the effect on the overlapped bits of an address portion to determine the output of that portion.

A+B=K

It is known in the prior art that the result of an equality test A+B=K can be evaluated quickly. In accordance with this invention, we have determined that the equality test A+B=K is useful for calculating the fully decoded output signals of FIG. 4, for example. Given three n-bit vectors $A = a_{n-1} a_{n-2} \ldots a_0$, $B = b_{n-1} b_{n-2} \ldots b_0$, and $K = k_{n-1} k_{n-2} \ldots k_0$, the carry in ($c_i^{in}$) and carry out ($c_i^{out}$) of each bit position i are uniquely determined if A+B=K. If for every bit position the carry out from the previous bit position is the necessary carry in to give $k_i$ as the answer, then A+B=K. More formally, define the propagate, generate, carry out, and sum for the ith bit as, respectively, $$p_i = a_i \oplus b_i \quad (1)$$

$$g_i = a_i \wedge b_i$$

$$c_i^{out} = (p_i \wedge c_i^{in}) \vee g_i$$

$$s_i = p_i \oplus c_i^{in}$$

A+B=K can be determined by testing $s_i$ against $k_i$ for all bit positions i; an add followed by a compare. However, if the answer is K, then $$c_{i-1}^{out} = (p_{i-1} \wedge \overline{k_{i-1}}) \vee g_{i-1} = ((a_{i-1} \oplus b_{i-1}) \wedge \overline{k_{i-1}}) \vee (a_{a-i} \wedge b_{i-1}) \quad (2)$$

$$c_i^{in} = k_i \oplus p_i = k_i \oplus (a_i \oplus b_i)$$

Note that $c_i^{in}$ and $c_{i-1}^{out}$ do not depend on propagation, rather only on a, b, and k from their respective bit positions.

If $$\prod_{i=0}^{k-1}(\overline{c_i^{in} \oplus c_{i-1}^{out}}) \tag{3}$$

is true then a simple inductive proof (given formally by Cortadella and Llaberia in "Evaluating A+B=K Conditions in Constant Time," IEEE International Symposium on Circuits and Systems, 1988, pages 243–6 and in "Evaluation of A+B=K Conditions Without Carry Propagation", IEEE Transactions on Computers, November, 1992, 41(11) :1484–8) established that starting with $c_{-1}^{out}$ as the overall carry in proves that A+B=K.

A+B=K Equality Testing to Provide Fast Decode

Figure 1:
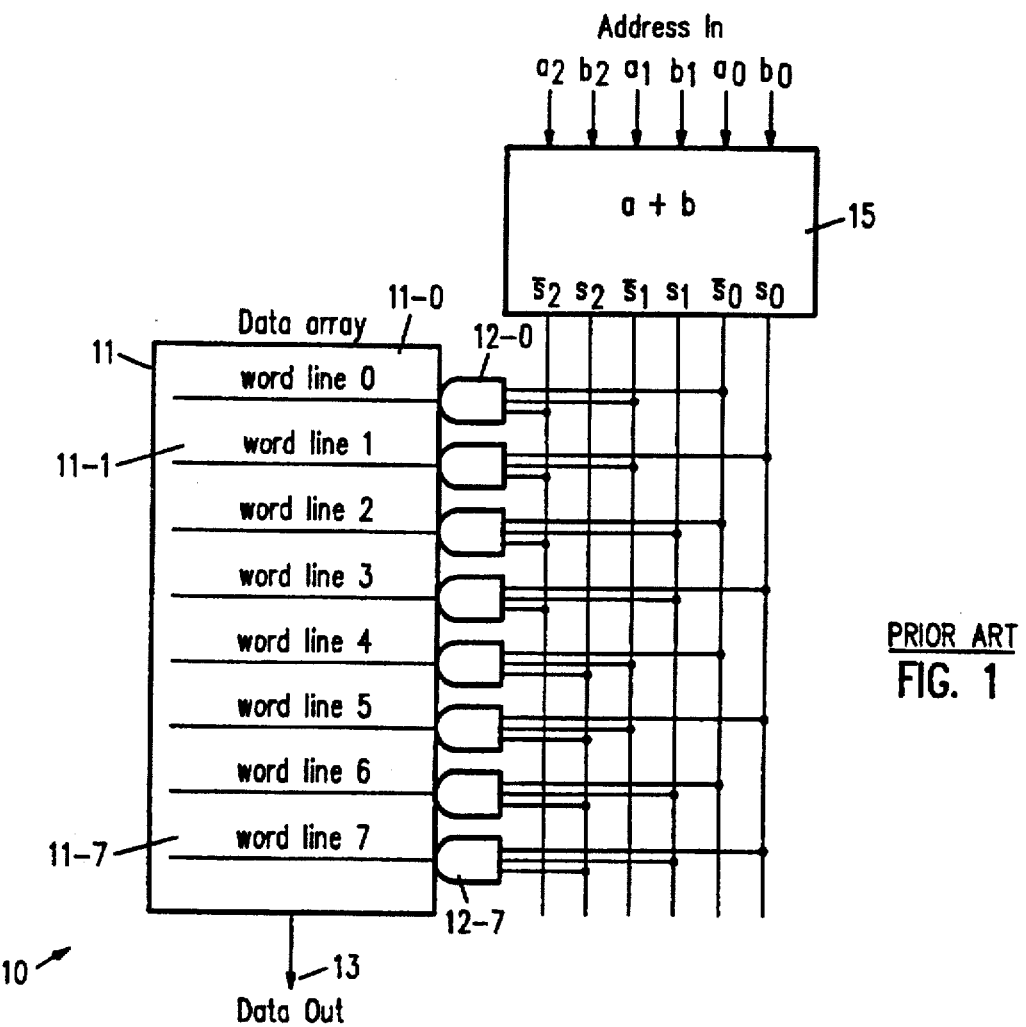
FIG. 1 is a diagram depicting a typical prior art addition indexed memory.

The decoder array of RAMs can be considered to perform a large ANDing of the address lines. FIG. 1 shows the logic of a RAM decoder (the actual implementation may vary) for an eight entry RAM with three address bits. The AND gates of the decoder array simultaneously test S=K for each word line K.

Single bit SAM example

This high degree of decoding parallelism is used to advantage to produce a SAM; each word-line AND independently tests to see if A+B equals that word-line's K. To perform this highly parallel test, the "address" sent down the address lines into the decoder clearly cannot depend on K. To this end, define an equality function $$e_i = \overline{c_i^{in} \oplus c_{i-1}^{out}} = c_i^{in} \oplus \overline{c_{i-1}^{out}} \tag{4}$$

and conditionalize $e_i$ with $k_i k_{i-1}$, giving $$e_i^{k_i k_{i-1}} = e_{i|k_{i-1}} = (c_i^{in}|_{k_i} \oplus \overline{c_{i-1}^{out}|_{k_{i-1}}}) \tag{5}$$

Conditionalizing the carry in and carry out equations results in computationally simple formulas:

$$c_i^{in}|_{k_i=0} = a_i \oplus b_i \tag{6}$$

$$c_i^{in}|_{k_i=1} = \overline{a_i \oplus b_i}$$

$$c_{i-1}^{out}|_{k_{i-1}=0} = a_{i-1} \vee b_{i-1}$$

$$c_{i-1}^{out}|_{k_{i-1}=1} = a_{i-1} \wedge b_{i-1}$$

For each bit position there are four cases of $e_i^{k_i k_{i-1}}$ $$e_i^{00} = (a_i \oplus b_i) \oplus \overline{(a_{i-1} \vee b_{i-1})} \tag{7}$$

$$e_i^{01} = (a_i \oplus b_i) \oplus \overline{(a_{i-1} \wedge b_{i-1})}$$

$$e_i^{10} = \overline{(a_i \oplus b_i)} \oplus \overline{(a_{i-1} \vee b_{i-1})}$$

$$e_i^{11} = \overline{(a_i \oplus b_i)} \oplus \overline{(a_{i-1} \wedge b_{i-1})}$$

FIGS. 5a through 5d are examples of circuits providing logical functions for these examples of $e_i$ functions, except for the low-order bit position, where the carry in, $c_{-1}$, replaces the i–1 terms $$e_0^{0c} = (a_0 \oplus b_0) \oplus \overline{c_{-1}} \tag{8}$$

$$e_0^{1c} = \overline{(a_0 \oplus b_0)} \oplus \overline{c_{-1}}$$

Logically these equations can be performed in two levels of exclusive-OR gates, or they can be implementable in one complex gate. If area or power constrain more than speed, then the significant number of common terms allows slower implementations with fewer gates.

Figure 6:
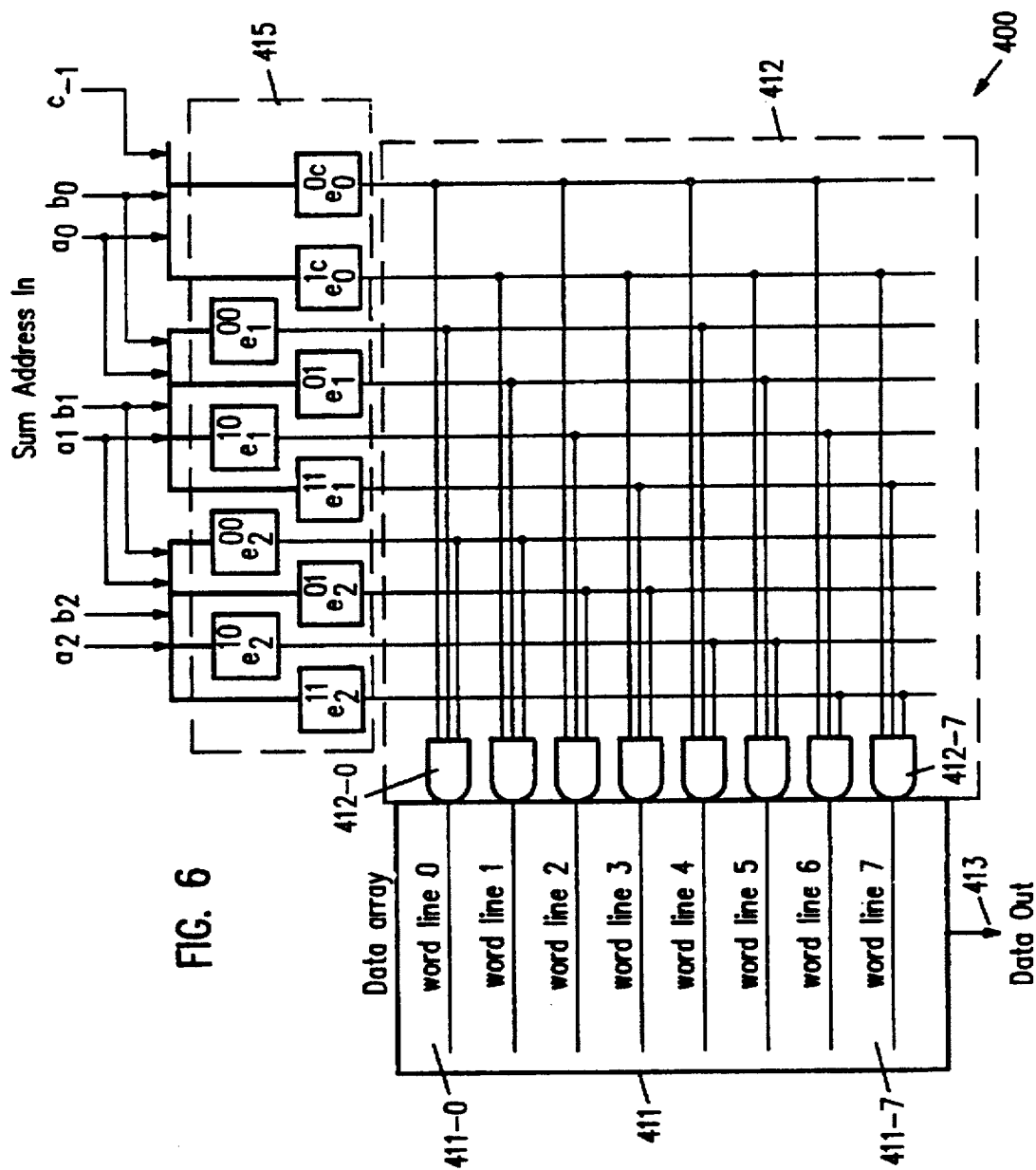
FIG. 6 is a diagram depicting one embodiment of a sum-address-memory constructed in accordance with the teachings of this invention.

FIG. 6 is a schematic diagram of one embodiment of a SAM memory system 400 constructed in accordance with the teachings of this invention. As shown in FIG. 6, memory array 411 includes a plurality of word lines 411-0 through 411-7, each storing a word which is capable of being selectively accessed by AND gates 412-0 through 412-7 and output on output bus 413. In accordance with the teachings of this invention, signals are provided to AND gates 412-0 through 412-7 from sum-addressed circuitry 415 in response to base address word a2, a1, a0, and offset address b2, b1, b0, and carry in bit $c_{-1}$. Sum-addressed circuitry 415 includes a plurality of equality function circuits for providing an equality comparison between $C_{in}$ and $C_{out}$ of consecutive bits, using for example the circuits of FIGS. 5a–5d. These equality functions provide the $2^j$ of $2^n$ decoding of the sum function. The number of equality function circuits required is $2^{n+1}$ equality circuit functions for all the high order bits, and $2^n$ function circuits for the low order bits, for an n bit SAM or SCAM of this invention, which is discussed later.

The number of address lines per address bit into decoder 415 doubles from two (true and complement of each address bit), as shown in FIG. 1, to four, (true and complement of each of the two address bits) while each word line decoder AND gate ANDs the same number of terms as in a prior art decoder array (such as is shown in FIG. 1). Thus, inside decoder array 412, SAM decoding resembles two-bit predecoding. Two of the four equality gates per pair of address bits are on at once, corresponding to two sequential addresses. For a 1-bit SAM, two of these four lines into the decoder array are complements of the other two (this characteristic does not hold for the multiple-bit SAM).

The base and offset of the address arrive into SAM decoder array 415. However, if the lower bits of the address do not index the memory, as is the case in a cache memory which uses low order bits of the address as a line offset and not as an index; then SAM decoding cannot decode these low-order bits, as they vary for a given index. The SAM decoder thus requires the carry-in $c_{-1}$ bit, which is the result of the addition of the low order bits of the base and offset addresses.

Fortunately, the number of low order bits not used to index the memory, as in a cache, is typically small, and the carry-out $c_{-1}$ of the low-order bits can be calculated quickly. In one embodiment, the SAM address lines responsive to the carry-out bit $c_{-1}$ are intentionally made faster than other SAM address lines, to further prevent a reduction in overall circuit speed as a result of the need to calculate the carry bit $c_{-1}$. A fast carry-out circuit from the low order bits is necessary; fortunately this circuit is typically small and as only the single carry-out bit is needed, in one embodiment power is allocated to speed this calculation and prevent delaying the overall memory access. Alternatively, a (k,k+1) pair of consecutive memory locations are read from the memory and one of these is then selected by the late-arriving carry-in bit $c_{-1}$. This second embodiment preferably utilizes either effectively dual-porting or banking the memory into even and odd banks, and may require twice as many bit-lines and/or twice as many word-lines as waiting for the carry-in.

Figure 7:
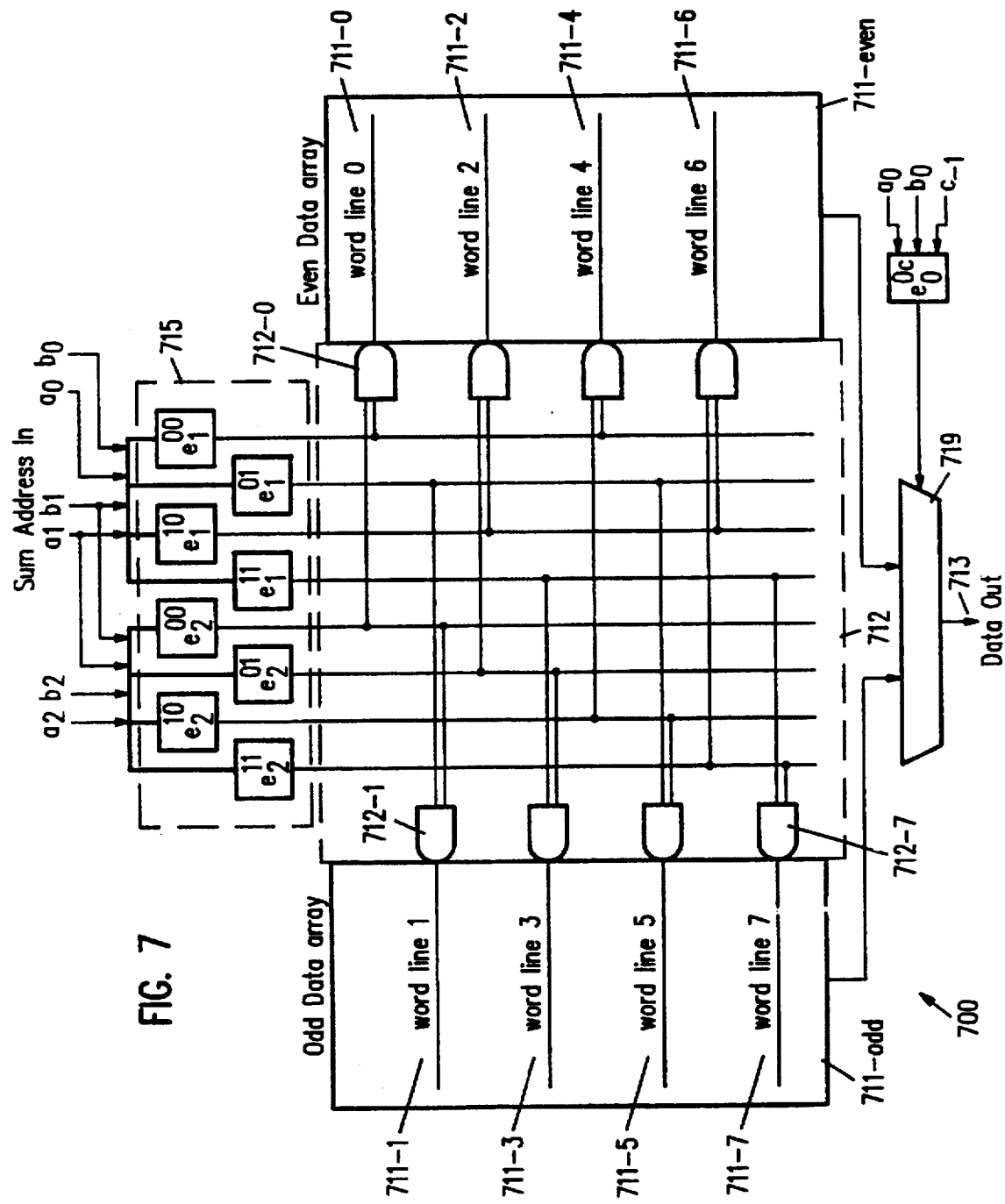
FIG. 7 is a diagram of one embodiment of a SAM decoder of this invention capable of performing with a late carry.

In an alternative embodiment, as shown in the example of FIG. 7, an embodiment of a SAM construction in accordance with the teachings of this invention capable of operating with late carry bits is shown. The late carry SAM indexed memory 700 of FIG. 7 includes a plurality of word lines, such as word lines 711-0 through 711-7, split into a plurality of data rays, such as even data array 711-even containing word line 711-0, 711-2, 711-4, and 711-6, and odd data array 711-odd including word line 711-1, 711-3, 711-5, and 711-7. Decoder circuitry 715 receives a base address word A2, A1, A0 and offset address or b2, b1, b0, and it manipulates that data utilizing $e_i$ functions in order to provide output words to decoder array 712 which utilizes, for example, a plurality of AND gates 712-0 through 712-7 corresponding to word line 711-0 through 711-7. Odd and even data arrays 711-odd and 711-even thus provide, for each addressing operation, an output data word to multiplexer 719. Multiplexer 719 selects the appropriate one of these data words in response to an $e_i$ function responsive to $a_0$, $b_0$, and the carry bit $c_{-1}$, in order to provide the desired one of the data words on output data bus 713. Of interest, in this embodiment, the generation of carry bit $c_{-1}$ is delayed somewhat from the availability of the base and offset address words. However, since odd and even data arrays 711-odd and 711-even are responsive to the base and offset address words without regard to the delayed carry bit, the delay in providing the carry bit $c_{-1}$ corresponds generally to the time delay between the availability of the base and offset address words and the accessing of odd and even data arrays 711-odd and 711-even. Thus, when the delayed carry bit $c_{-1}$ becomes available, the operation of multiplexer 719 takes place on the by then available output data words from odd and even data array 711-odd and 711-even.

Multiple-bit SAM Memories

In the previously described embodiment of the SAM decoder, each word line decoder AND gate has n inputs, where n is the number of bits in each cell's address K. For each address bit i, a group of four "equality" signals are computed: $e_i^{00}$, $e_i^{01}$, $e_i^{10}$, and $e_i^{11}$ (an exception to this rule is the least-significant bit position, where only $e_0^{0c}$ and $e_1^{1c}$ are required). The resulting 4n−2 signals are distributed to the decoder gates, where N is the number of address bits. These decoder gates then pick off one signal from the equality group for each address bit i, as determined by the bit i and bit i−1 values of the gate's address. We call this a "single-bit" SAM decoder, because there is an equality group for each bit of the address. This approach works well for small memories, but, as memory size increases, we encounter physical limits to the fan-in of word line decoder gates. One solution to this problem is for each equality group to examine more bit positions of the address inputs. This is analogous to the "predecode" technique used in conventional RAMs. For example, a "two-bit" SAM memory has an equality group for each two adjacent address bit positions.

Figure 8:
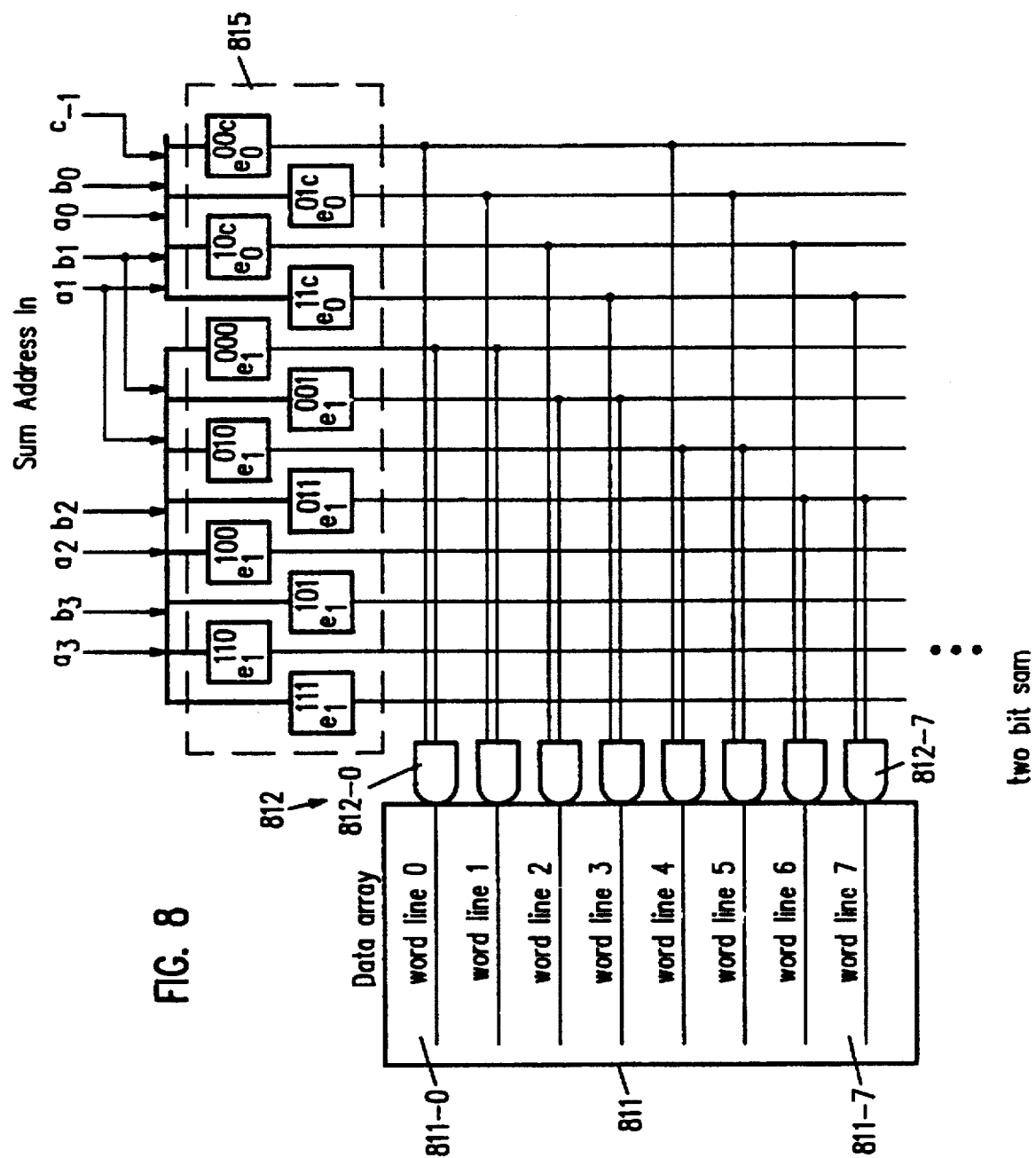
FIG. 8 is a diagram depicting a multiple bit SAM of this invention.

FIG. 8 is a diagram of an exemplary two-bit SAM, used to describe a multiple bit SAM constructed in accordance with the teachings of this invention, which also applies to multiple bit SAMs of more than two bits. As shown in FIG. 8, a multiple bit SAM of this invention includes a data array 811 including a plurality of word lines 811-0 through 811-7. Word lines 811-0 through 811-7 are accessed by decoder array 812, for example including a plurality of AND gates 812-0 through 812-7 corresponding to word lines 811-0 through 811-7, respectively. SAM decoder array 815 includes a plurality of $e_i$ functions responsive to an appropriate permutation of bits from the base address, offset address, and carry bit $c_{-1}$. In terms of the single-bit equality functions that have been previously described, the exemplary two-bit equality functions are:

$$e_i^{000} = e_i^{00} \wedge e_{i-1}^{00} \quad (9)$$

$$e_i^{001} = e_i^{00} \wedge e_{i-1}^{01}$$

$$e_i^{010} = e_i^{01} \wedge e_{i-1}^{10}$$

$$e_i^{011} = e_i^{01} \wedge e_{i-1}^{11}$$

$$e_i^{100} = e_i^{10} \wedge e_{i-1}^{00}$$

-continued $$e_i^{101} = e_i^{10} \wedge e_{i-1}^{01}$$

$$e_i^{110} = e_i^{11} \wedge e_{i-1}^{10}$$

$$e_i^{111} = e_i^{11} \wedge e_{i-1}^{11}$$

The LSB group is again a special case:

$$e_1^{00c} = e_1^{00} \wedge e_0^{0c} \quad (10)$$

$$e_1^{01c} = e_1^{01} \wedge e_0^{1c}$$

$$e_1^{10c} = e_1^{10} \wedge e_0^{0c}$$

$$e_1^{11c} = e_1^{11} \wedge e_0^{1c}$$

For a SAM memory with an n-bit address (for simplicity, assume n is even), there are n/2 equality groups, each (except the low-order group) having eight equality signals. This gives a total of 4n-4 equality signals, which is approximately the same number required in the single-bit scheme. Each word line decoder gate has n/2 inputs, one from each group; the loading on each equality signal is half what it was in the single-bit scheme.

In one embodiment, these two-bit equality functions are generated from the single-bit equality functions by a single level of 2-input AND gates, as in a conventional RAM predecoder; the longest path from input to equality is thus two levels of XOR/XNOR (for the single-bit equality functions) plus an AND level. In an alternative embodiment, the two-bit equality function are generated directly from the inputs. The fact that the two-bit equality functions examine adjacent bits allows some algebraic simplification. For example, if we define $u_i = a_i \vee b_i$ and substitute, the two-bit equality functions reduce to $$e_i^{000} = (p_i \wedge p_{i-1} \wedge u_{i-2}) \vee (p_i \wedge g_{i-1} \wedge \overline{u_{i-2}}) \vee (\overline{p_i} \wedge \overline{u_{i-1}} \wedge \overline{u_{i-2}}) \quad (11)$$

$$e_i^{001} = (p_i \wedge p_{i-1} \wedge g_{i-2}) \vee (p_i \wedge g_{i-1} \wedge \overline{g_{i-2}}) \vee (\overline{p_i} \wedge \overline{u_{i-1}} \wedge \overline{g_{i-2}})$$

$$e_i^{010} = (\overline{p_i} \wedge p_{i-1} \wedge \overline{u_{i-2}}) \vee (p_i \wedge g_{i-1} \wedge u_{i-2}) \vee ((\overline{p_i} \wedge \overline{u_{i-1}} \wedge u_{i-2})$$

$$e_i^{011} = (\overline{p_i} \wedge p_{i-1} \wedge \overline{g_{i-2}}) \vee (p_i \wedge g_{i-1} \wedge g_{i-2}) \vee (\overline{p_i} \wedge \overline{u_{i-1}} \wedge g_{i-2})$$

$$e_i^{100} = (\overline{p_i} \wedge p_{i-1} \wedge u_{i-2}) \vee (\overline{p_i} \wedge g_{i-1} \wedge \overline{u_{i-2}}) \vee (p_i \wedge u_{i-1} \wedge \overline{u_{i-2}})$$

$$e_i^{101} = (\overline{p_i} \wedge p_{i-1} \wedge g_{i-2}) \vee (\overline{p_i} \wedge g_{i-1} \wedge \overline{g_{i-2}}) \vee (p_i \wedge u_{i-1} \wedge \overline{g_{i-2}})$$

$$e_i^{111} = (p_i \wedge p_{i-1} \wedge \overline{g_{i-2}}) \vee (\overline{p_i} \wedge g_{i-1} \wedge g_{i-2}) \vee (p_i \wedge \overline{u_{i-1}} \wedge g_{i-2})$$

$$e_1^{00c} = (p_i \wedge p_0 \wedge c_{-1}) \vee (p_1 \wedge g_0 \wedge \overline{c_{-1}}) \vee (\overline{p_1} \wedge \overline{u_0} \wedge \overline{c_{-1}})$$

$$e_1^{01c} = (\overline{p_i} \wedge p_0 \wedge \overline{c_{-1}}) \vee (p_1 \wedge g_0 \wedge c_{-1}) \vee (\overline{p_1} \wedge \overline{u_0} \wedge \overline{c_{-1}})$$

$$e_1^{10c} = (\overline{p_i} \wedge p_0 \wedge c_{-1}) \vee (\overline{p_1} \wedge g_0 \wedge \overline{c_{-1}}) \vee (p_1 \wedge \overline{u_0} \wedge \overline{c_{-1}})$$

$$e_1^{11c} = (p_i \wedge p_0 \wedge \overline{c_{-1}}) \vee (\overline{p_1} \wedge g_0 \wedge c_{-1}) \vee (p_1 \vee \overline{u_0} \wedge c_{-1})$$

The longest path in the two-bit equality function (assuming that all inputs are available simultaneously) is an XOR/XNOR followed by a 3-input AND followed by a 3-input OR. Each of the 4n+4 equality signals requires a 3—3—3-AND-OR gate. Built in this manner, the AND-OR gates load the intermediate nets more than for a 1-bit SAM, as shown in Table 3 corresponding with this example.

TABLE 3

| SAM intermediate net loading (fanout) | | |
|---|---|---|
| Signal | 1-bit SAM | 2-bit SAM |
| p | 2 | 20 |
| p̄ | 2 | 12 |
| g | 2 | 14 |
| ḡ | 0 | 6 |
| u | 2 | 6 |
| ū | 0 | 14 |

SCAM Memories

In an alternative embodiment of this invention, a sum-content-addressable memory (SCAM) is taught. Unlike the previously described SAM memories of this invention, in which address lines and equality functions are hard wired, in a SCAM of this invention, circuitry is utilized to allow equality functions to be selected based upon contents stored in the content addressable memory. The SCAM cell implements a conditional equality of the correct $e_0^{kiki-1}$ terms based on the contents of adjacent cells. However, SCAM requires more logic than a normal Content Addressable Memory (CAM) cell of the prior art. The "constant" K (the word line address in a RAM) becomes a variable in a SCAM, and thus in one embodiment, the pseudo-address lines consist of components of the carry equality (from the intermediate signal paths of FIGS. 5a–5d) rather than the four conditionalized carry equalities (from the final output lines of FIGS. 5a–5d). XOR, AND, and OR operations of the address components suffice to construct the equality signals in a one-bit SCAM cell.

Figure 9:
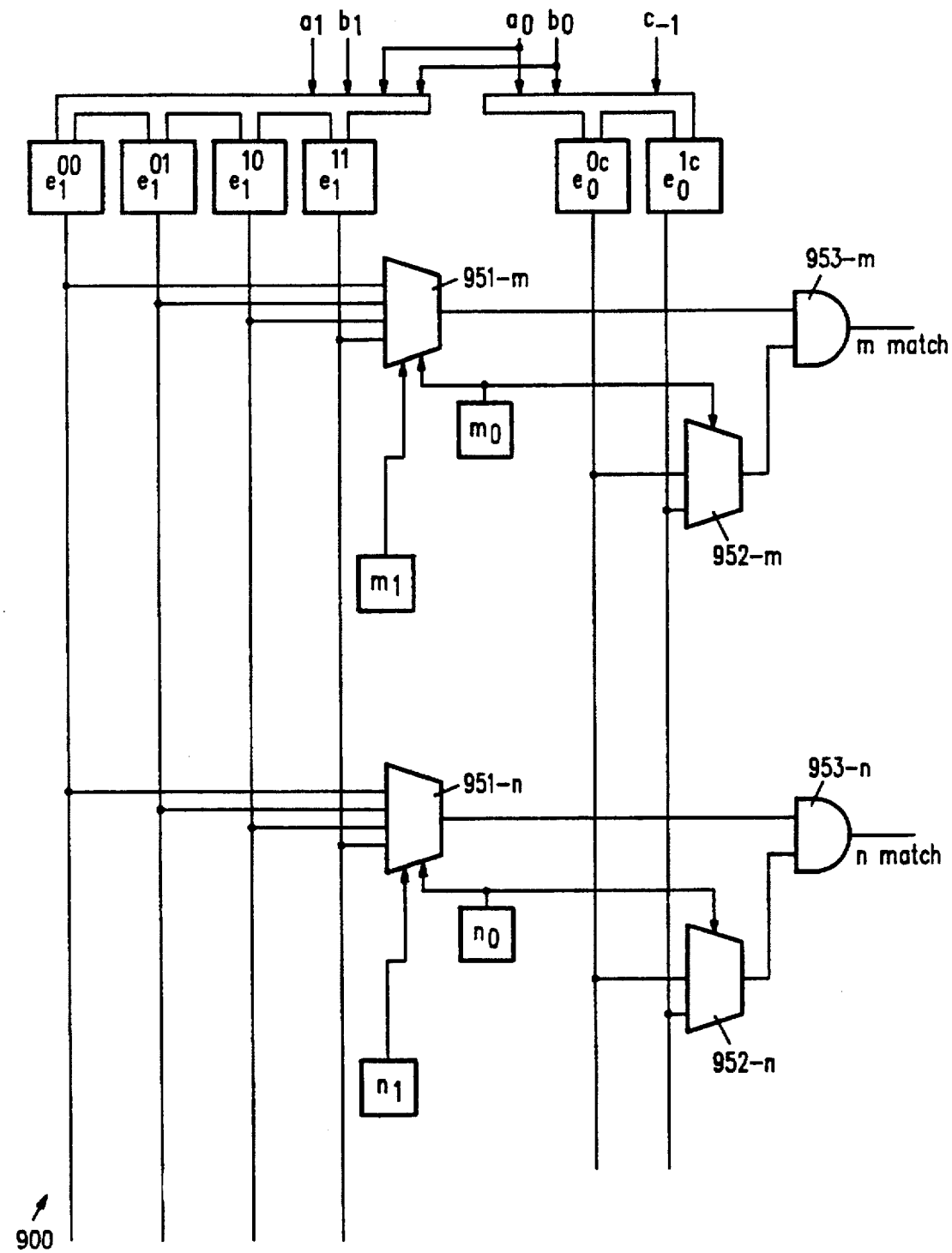
FIG. 9 is a diagram depicting one embodiment of a sum-content-addressable memory (SCAM) of this invention.

FIG. 9 depicts one embodiment of a SCAM constructed in accordance with this invention. Referring to FIG. 9, SCAM 900 receives base address words a1, and a0, and an offset address word b1, b0, as well as carry bit $c_{-1}$. These address bits are applied to equality functions as shown, in order to generate appropriate decoded signals for application to multiplexers 951-m, 952-m, 951-n, and 952-n. These multiplexers are controlled by stored bits which serve to select the appropriate e functions corresponding to the value of the plurality of consecutive stored bits (for the LSB with carry-in, fewer stored bits). The outputs from multiplexers 951-m and 952-m are applied to AND gate 953-m, in order to determine if there is an m-match, indicating no error has been detected, i.e. the equality functions are appropriately selected across the entire width of the stored memory value. Similarly, the output bits from multiplexers 951-n and 952-n are applied to AND gate 953-n to determine if there is an n-match. In accordance with the teachings of this invention, when SCAM 900 is configured using addition functions to be more than a 2-bit SCAM, AND gates 953-m and 953-n receive an increased number of decoded output signals from the equality function circuitry as it is currently shown, and with respect to its generic description, such as more than two bits. In a simple configuration, the n-match and m-match signals are directly used as word line select signals.

In one embodiment of this invention, the carry-in bit used as a late select after the SCAM has cycled and matched up to two consecutively valued entries, one even, one odd, as previously described with respect to the SAM of this invention.

Conclusions

The XOR, SAM, and SCAM methods and structures taught by this invention reduce the address-components-ready to data-ready latency in memories accessed with base+offset addresses over the conventional addition followed by memory access. Candidates for these techniques include main memory data caches, instruction caches, register windows, and TLBs.

XOR memories decrease latency the most of these techniques, reducing latency to just one 2-input XOR gate over the RAM access. However, XOR memories introduce duplicate-entry problems because the memory location accessed may not always be the same for a given memory address. Extra hardware is necessary to prevent these problems, and when used as a cache memory, the miss rate deteriorates by about 10% (e.g., from 4.0 to 4.4 misses per 100 instructions) in the above example.

A SAM memory also reduces latency below add-then-index memory latency, reducing the latency to two 2-input XOR gates over the RAM access. A SAM memory indexes the correct memory location, and therefore has no duplicate-entry problems and when used as a cache memory, has a miss rate identical to a conventional cache.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A memory comprising:

a first set of address leads for receiving one or more base address bits organized into a plurality of segments;

a second set of address leads for receiving one or more offset address bits organized into plurality of segments;

a data array comprising a plurality of word lines;

address manipulation circuitry comprising:

a plurality of low latency hash functions, other than adders, each responsive to a unique combination of said base and offset address bits and including overlap between segments of said base address bits and said offset address bits, for providing a plurality of hash output signals which are fully decoded and in which more than one of said fully decoded signal is high; and a decoder array comprising a plurality of decoders, each associated with one of said word lines, for receiving a selected combination of said hash signals to address a desired one of said word lines.

2. A memory as in claim 1 wherein the amount of said overlap is determined at least in part by the function performed by said hash functions.

3. A memory as in claim 2 wherein the amount of said overlap is also determined by the number of bits manipulated by each said hash function.

4. A memory as in claim 1 wherein said segments need not be of the same number of bits.

5. A memory as in claim 1 wherein said overlaps need not be of the same number of bits.

6. A memory as in claim 1 wherein said address leads include carry in bits.

7. A memory as in claim 1 wherein said hash functions emulate adders.

8. A memory as in claim 1 wherein said hash functions comprise a plurality of equality functions.

9. A memory as in claim 8 wherein said equality functions comprise:

$$e_i^{00} = (a_i \oplus b_i) \oplus \overline{(a_{i-1} \vee b_{i-1})}$$

$$e_i^{01} = (a_i \oplus b_i) \oplus \overline{(a_{i-1} \wedge b_{i-1})}$$

$$e_i^{10} = (a_i \oplus b_i) \oplus \overline{(a_{i-1} \vee b_{i-1})}$$

$$e_i^{11} = (a_i \oplus b_i) \oplus \overline{(a_{i-1} \wedge b_{i-1})}$$

where:

$e_i^{00}$, $e_i^{01}$, $e_i^{10}$, $e_i^{11}$ represent said equality functions corresponding to the $i^{th}$ bit position.

$a_i$, $a_{i-1}$ represent the $i^{th}$ and the $(i-1)^{th}$ position bit of said base address bits respectively; and $b_i$, $b_{i-1}$ represent the $i^{th}$ and the $(i-1)^{th}$ position bit of said offset address bits respectively.

10. A memory as in claim 8 wherein said equality functions comprise:

$$e_i^{000} = e_i^{00} \wedge e_{i-1}^{00}$$

$$e_i^{001} = e_i^{00} \wedge e_{i-1}^{01}$$

$$e_i^{010} = e_i^{01} \wedge e_{i-1}^{10}$$

$$e_i^{011} = e_i^{01} \wedge e_{i-1}^{11}$$

$$e_i^{100} = e_i^{10} \wedge e_{i-1}^{00}$$

$$e_i^{101} = e_i^{10} \wedge e_{i-1}^{01}$$

$$e_i^{110} = e_i^{11} \wedge e_{i-1}^{10}$$

$$e_i^{111} = e_i^{11} \wedge e_{i-1}^{11}$$

where:

$e_i^{000}$, $e_i^{001}$, $e_i^{010}$, $e_i^{011}$, $e_i^{100}$, $e_i^{101}$, $e_i^{110}$, $e_i^{111}$ represent two-bit equality functions corresponding to the $i^{th}$ bit position, $e_i^{00}$, $e_i^{01}$, $e_i^{10}$, $e_i^{11}$ represent single-bit equality functions corresponding to the $i^{th}$ bit position, and $e_{i-1}^{00}$, $e_{i-1}^{01}$, $e_{i-1}^{10}$, $e_{i-1}^{11}$ represent single-bit equality functions corresponding to the $(i-1)^{th}$ bit position.

11. A memory as in claim 8 wherein said input vectors include carry in bits and said equality functions further comprise:

$$e_1^{00c} = e_1^{00} \wedge e_0^{0c}$$

$$e_1^{01c} = e_1^{01} \wedge e_0^{1c}$$

$$e_1^{10c} = e_1^{10} \wedge e_0^{0c}$$

$$e_1^{11c} = e_1^{11} \wedge e_0^{1c}$$

where:

$e_1^{00c}$, $e_1^{01c}$, $e_1^{10c}$, $e_1^{11c}$ represent two-bit equality functions corresponding to bit position 1, $e_1^{00}$, $e_1^{01}$, $e_1^{10}$, $e_1^{11}$ represent single-bit equality functions corresponding to bit position 1, $e_0^{0c}$, $e_0^{1c}$ represent single-bit equality functions corresponding to bit position 0, and c represents said carry in bits.

12. A memory as in claim 8 wherein said input vectors include carry in bits and said equality functions comprise:

$$\frac{e_i^{000}}{u_{i-1} \wedge u_{i-2}} = (p_i \wedge p_{i-1} \wedge u_{i-2}) \vee (p_i \wedge g_{i-1} \wedge \overline{u_{i-2}}) \vee (\bar{p}_i \wedge$$

$$\frac{e_i^{001}}{u_{i-1} \wedge g_{i-2}} = (p_i \wedge p_{i-1} \wedge g_{i-2}) \vee (p_i \wedge g_{i-1} \wedge \overline{g_{i-2}}) \vee (\bar{p}_i \wedge$$

$$\frac{e_i^{010}}{u_{i-1} \wedge u_{i-2}} = (\bar{p}_i \wedge p_{i-1} \wedge \overline{u_{i-2}}) \vee (p_i \wedge g_{i-1} \wedge u_{i-2}) \vee ((\bar{p}_i \wedge$$

$$\frac{e_i^{011}}{u_{i-1} \wedge g_{i-2}} = (\bar{p}_i \wedge p_{i-1} \wedge \overline{g_{i-2}}) \vee (p_i \wedge g_{i-1} \wedge g_{i-2}) \vee (\bar{p}_i \wedge$$

$$\frac{e_i^{100}}{u_{i-1} \wedge u_{i-2}} = (\bar{p}_i \wedge p_{i-1} \wedge u_{i-2}) \vee (\bar{p}_i \wedge g_{i-1} \wedge \overline{u_{i-2}}) \vee (p_i \wedge$$

$$\frac{e_i^{101}}{u_{i-1} \wedge g_{i-2}} = (\bar{p}_i \wedge p_{i-1} \wedge g_{i-2}) \vee (p_i \wedge g_{i-1} \wedge \overline{g_{i-2}}) \vee (p_i \wedge$$

$$\frac{e_i^{111}}{u_{i-1} \wedge g_{i-2}} = (p_i \wedge p_{i-1} \wedge \overline{g_{i-2}}) \vee (\bar{p}_i \wedge g_{i-1} \wedge g_{i-2}) \vee (p_i \wedge$$

$$\frac{e_1^{00c}}{c_{-1}} = (p_1 \wedge p_0 \wedge c_{-1}) \vee (p_1 \wedge g_0 \wedge \overline{c_{-1}}) \vee (\bar{p}_1 \wedge \bar{u}_0 \wedge$$

$$\frac{e_1^{01c}}{c_{-1}} = (\bar{p}_1 \wedge p_0 \wedge \overline{c_{-1}}) \vee (p_1 \wedge g_0 \wedge c_{-1}) \vee (\bar{p}_1 \wedge \bar{u}_0 \wedge$$

$$\frac{e_1^{10c}}{c_{-1}} = (\bar{p}_1 \wedge p_0 \wedge c_{-1}) \vee (\bar{p}_1 \wedge g_0 \wedge \overline{c_{-1}}) \vee (p_1 \wedge \overline{u_0} \wedge$$

$$\frac{e_1^{11c}}{c_{-1}} = (p_1 \wedge p_0 \wedge \overline{c_{-1}}) \vee (\bar{p}_1 \wedge g_0 \wedge c_{-1}) \vee (p_1 \vee \overline{u_0} \wedge$$

where:

$$u_i = a_i \vee b_i$$

where:

$a_i$ represents the $i^{th}$ position bit of said base address bits;

$a_i$ represents the $i^{th}$ position bit of said offset address bits;

$e_i^{000}$, $e_i^{001}$, $e_i^{010}$, $e_i^{011}$, $e_i^{100}$, $e_i^{101}$, $e_i^{110}$, $e_i^{111}$ represent two-bit equality functions corresponding to the $i^{th}$ bit position, $e_1^{00c}$, $e_1^{01c}$, $e_1^{10c}$, $e_1^{11c}$ represent two-bit equality functions corresponding to bit position 1, $p_i$, $p_{i-1}$, $p_1$, $p_0$ represent the propagates corresponding to bit positions i, (i-1), 1, and 0 respectively.

$g_{i-1}$, $g_{i-2}$, $g_0$ represent the generates corresponding to bit position (i-1), (i-2) and 0 respectively, and $c_{-1}$ represents said carry in bit.

13. A memory as in claim 1 wherein said data array comprises a plurality of word lines organized as a plurality of banks which are read simultaneously in response to said hash output signals, and selection circuitry for selecting a desired one of said plurality of read word lines as a function of a selected subset of said address bits.

14. A memory as in claim 13 wherein said hash functions emulate adders.

15. A memory as in claim 13 wherein said hash functions comprise a plurality of equality functions.

16. A memory as in claim 1 which further comprises selection circuitry for selecting desired ones of said hash output signals for application to said decoder, as a function of the contents of said overlapping segments of address bits.

17. A memory as in claim 16 which further comprises a lookup table to control said selection circuitry, based on said overlapping segments of address bits.

18. A memory as in claim 9 wherein said input vectors include carry in bits and said equality functions further comprise;

$$e_0^{0c} = (a_0 \oplus b_0) \oplus \overline{c_{-1}}$$

$$e_0^{1c} = \overline{(a_0 \oplus b_0)} \oplus \overline{c_{-1}}$$

where:

$e_0^{0c}$, $e_0^{1c}$ represent equality functions corresponding to the low order bit positions, $a_0$ represents the $0^{th}$ position bit of said base address bits, $b_0$ represents the $0^{th}$ position bit of said offset bits, and c represents said carry in bits.

* * * * *